Oct. 15, 1968     AKIRA TANAKA     3,405,539

FLEXIBLE ROTARY JOINT

Filed June 13, 1966

INVENTOR.
Akira Tanaka
BY
Herbert Furman
ATTORNEY

United States Patent Office 3,405,539
Patented Oct. 15, 1968

3,405,539
FLEXIBLE ROTARY JOINT
Akira Tanaka, Southfield, Mich., assignor to General Motors Corporation, Detroit, Mich., a corporation of Delaware
Filed June 13, 1966, Ser. No. 557,107
6 Claims. (Cl. 64—11)

ABSTRACT OF THE DISCLOSURE

A flexible rotary joint is of unitary polymeric plastic construction. The joint includes driving and driven end segments which are connected to a rectangular intermediate segment by tapered thin portions that define mutually perpendicular bending axes adjacent the intermediate portion.

---

This invention relates generally to rotary joints and more specifically to a flexible rotary joint which is capable of transmitting torque at an angle.

One feature of this invention is that the joint is of unitary construction. Another feature is that the joint is made of a synthetic polymeric material formed with a pair of integral bendable segments which are capable of transmitting torque. Yet another feature is that the bendable segments define a pair of mutually perpendicular bending axes that are both perpendicular to the aligned joint axis to permit joint angulation. Still another feature is that the bending axes are axially closely spaced to provide for the transmission of torque at an angle with minimal distortion of the joint.

Further features of this invention will become readily apparent upon reference to the following detailed description of the attached drawings in which.

Figure 1:
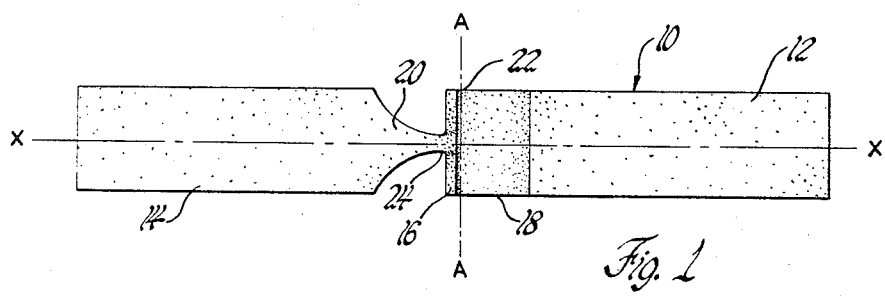
FIGURE 1 is a plan view of a flexible rotary joint according to this invention.

Referring now to the drawings, a flexible rotary joint according to this invention, generally indicated at 10, is formed of a semirigid plastic material, preferably a synthetic polymeric material such as polypropylene, polyethylene or polycinyl chloride. Such synthetic polymeric materials are quite pliable in thin sheets, but are much more rigid when formed in substantially thick sections.

Figure 4:
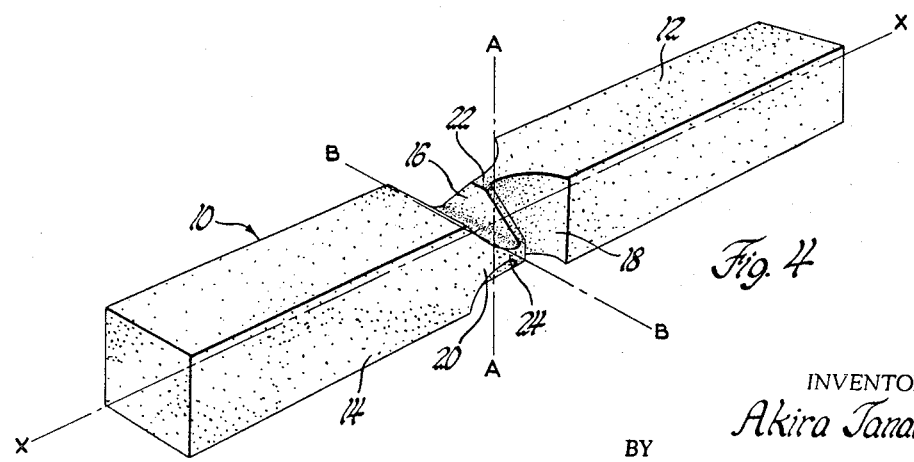
FIGURE 4 is a perspective view.

The joint 10 includes a pair of drive segments 12 and 14 which are mutually connected to an intermediate segment 16 by a pair of flexible segments or hinges 18 and 20, respectively. The hinges 18 and 20 taper from the drive segments to thin sections at respective webs 22 and 24 adjacent the intermediate segment 16. The webs 22 and 24 define respective bending axes A—A and B—B for hinges 18 and 20. As shown in FIGURE 4, webs 22 and 24 are formed so that axes A—A and B—B and the rotational axis X—X of joint 10 are mutually perpendicular.

Upon the application of a rotational force to segment 12 about axis X—X, torque is transmitted from segment 12 through hinge 18 to intermediate segment 16 and through hinge 20 to segment 14. Although webs 22 and 24 are relatively thin to permit bending, the synthetic polymeric material has sufficient strength to permit the transmission of a moderate amount of torque through the webs.

Figure 2:
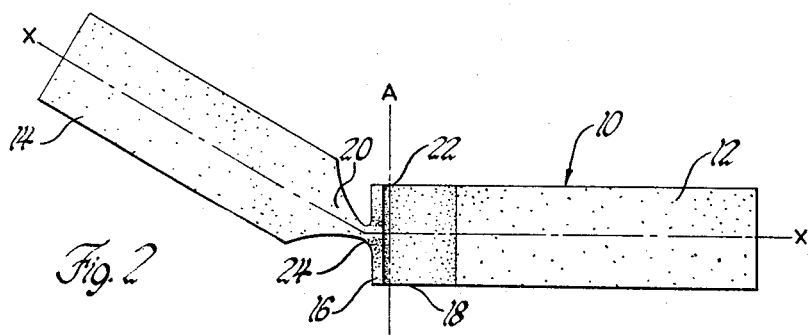
FIGURE 2 is a view similar to FIGURE 1, showing angulation of the joint.
Figure 3:
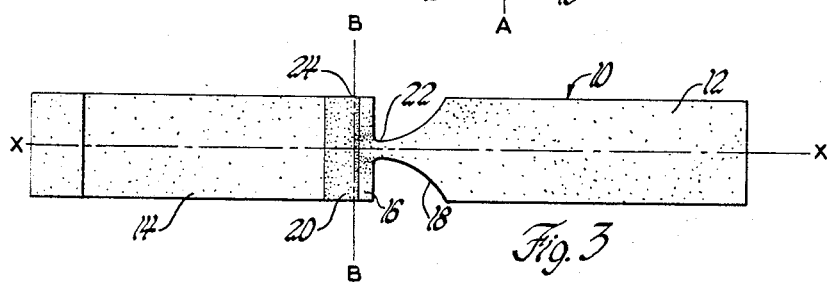
FIGURE 3 is an elevational view of the joint shown in FIGURE 2.

As shown in FIGURES 2 and 3, upon angulation of segments 12 and 14, the joint initially bends about axis B—B. Upon rotation, the bending is gradually transferred to axis A—A until only axis A—A is bent after 90° rotation. Each 90° rotation is accompanied by the transferral of bending from one axis to the other. Thus the operation of this joint is somewhat similar to that of a Cardan type universal joint.

As is well known in the art, the mutually perpendicular bending axes of a Cardan joint are coplanar, which permits radial stability of the joint during angulated rotation. The axes A—A and B—B of joint 10 are not exactly coplanar, but are slightly axially spaced. This spacing causes a slight nutation of segments 12 and 14 during rotation. However, the subject joint is designed for use in a low torque, noncritical application in which a slight amount of nutation is acceptable. Also, the elastic properties of the synthetic polymeric material partially compensate for this nutation.

A joint according to this invention has many practical applications, e.g. as a connection between a remote manual knob and a concealed switch or between a cylinder lock and a latch. Thus this joint may replace the more expensive rotary cable connections frequently used. This joint is very inexpensive because the entire joint may be formed in any shape or in any desired size simply by molding. Although the illustrative embodiment shown in the drawings is a bar which is square in cross section, any other desired shape may be utilized, such as hexagonal or round. Another advantage of this joint is that splined or other types of couplings may be molded directly onto the ends of the drive segments.

Thus this invention provides an inexpensive, simple, flexible rotary coupling formed of a single piece of plastic material which is capable of transmitting moderate amounts of torque during angulation. Although only a preferred embodiment of this invention is shown and described, further modifications are contemplated within the scope of the invention.

I claim:

1. In a unitary flexible rotary joint having spaced driving and driven segments, means flexibly interconnecting the driving and driven segments comprising: an intermediate segment spaced between the driving and driven segments, and a pair of flexible segments extending from thick sections at the driving and driven segments and tapering to mutually angled thin flexible sections at the intermediate segment to define adjacent mutually angled bending axes about which the joint flexes during rotation of the joint when the driving and driven segments are mutually angled.

2. The rotary joint recited in claim 1, wherein the bending axes are mutually perpendicular.

3. The rotary joint recited in claim 1, wherein the bending axes are each perpendicular to the joint rotational axis.

4. The rotary joint recited in claim 1, wherein the joint is formed of plastic.

5. The rotary joint recited in claim 4, wherein the plastic is a synthetic polymeric material.

6. The rotary joint recited in claim 1, wherein the joint is formed of a synthetic polymeric material and the bending axes and the joint rotational axes are mutually perpendicular.

References Cited

UNITED STATES PATENTS

| | | | |
|---|---|---|---|
| 2,591,769 | 4/1952 | Beechler | 64—15 |
| 2,643,528 | 6/1953 | Hammarbach | 64—15 |
| 2,860,495 | 11/1958 | Stark | 64—11 |
| 2,966,049 | 12/1960 | Ormond | 64—15 |
| 3,332,255 | 7/1967 | Seagreaves et al. | 64—11 |

FOREIGN PATENTS 1,002,800  8/1965  Great Britain.

HALL C. COE, *Primary Examiner.*